(12) United States Patent
Long

(10) Patent No.: US 11,016,566 B1
(45) Date of Patent: May 25, 2021

(54) CONTROLLERS WITH ASYMMETRIC TRACKING PATTERNS

(71) Applicant: Oculus VR, LLC, Menlo Park, CA (US)

(72) Inventor: Clare Regimbal Long, Edmonds, WA (US)

(73) Assignee: Facebook Technologies, LLC, Menlo Park, CA (US)

(*) Notice: Subject to any disclaimer, the term of this patent is extended or adjusted under 35 U.S.C. 154(b) by 4 days.

(21) Appl. No.: 15/992,194

(22) Filed: May 30, 2018

Related U.S. Application Data

(63) Continuation of application No. 14/934,073, filed on Nov. 5, 2015, now Pat. No. 10,007,339.

(51) Int. Cl.
*G06F 3/01* (2006.01)
*G06T 7/292* (2017.01)
*G06F 3/00* (2006.01)

(52) U.S. Cl.
CPC .............. *G06F 3/014* (2013.01); *G06F 3/005* (2013.01); *G06T 7/292* (2017.01)

(58) Field of Classification Search
CPC ... G06F 3/01; G06F 3/033; G06F 3/02; G06F 3/014; G06F 3/005; A63F 13/213; G06T 7/292
See application file for complete search history.

(56) References Cited

U.S. PATENT DOCUMENTS

| | | | |
|---|---|---|---|
| 4,518,164 | A | 5/1985 | Hayford, Jr. et al. |
| 4,552,360 | A * | 11/1985 | Bromley ............... A63F 13/06 463/38 |
| 5,087,825 | A | 2/1992 | Ingraham et al. |
| 5,181,009 | A | 1/1993 | Perona |
| 5,207,426 | A | 5/1993 | Inoue et al. |
| D341,094 | S | 11/1993 | Austin |
| 5,265,009 | A | 11/1993 | Colavita et al. |
| D350,351 | S | 9/1994 | Nakamura |
| 5,421,590 | A | 6/1995 | Robbins et al. |

(Continued)

OTHER PUBLICATIONS

Canadian Examiner's Report in Patent Application No. 163,150, dated Dec. 15, 2015, 5 pages.

(Continued)

*Primary Examiner* — Jose R Soto Lopez
(74) *Attorney, Agent, or Firm* — FisherBroyles, LLP

(57) ABSTRACT

A pair of handheld controllers with asymmetric tracking patterns for use with a tracking camera. The pair of controllers includes a right-hand controller and a left-hand controller. The right-hand and the left-hand controllers are substantially symmetric with respect to each other with the exception of their respective tracking patterns. A right-hand pattern of lights is disposed on the right-hand controller and a left-hand pattern of lights is disposed on the left-hand controller. The right-hand pattern of lights and the left-hand pattern of lights are asymmetric with respect to each other. The right-hand controller includes a right-hand handle portion and a surrounding right-hand ring portion and the left-hand controller includes a left-hand handle portion and a surrounding left-hand ring portion. The right-hand pattern of lights and the left-hand pattern of lights are disposed on the right-hand ring portion and the left-hand ring portion, respectively.

20 Claims, 4 Drawing Sheets

(56) References Cited

U.S. PATENT DOCUMENTS

| | | |
|---|---|---|
| D363,320 S | 10/1995 | Barthelemy et al. |
| 5,479,163 A | 12/1995 | Samulewicz |
| D369,754 S | 5/1996 | Donaldson |
| 5,551,701 A | 9/1996 | Bouton et al. |
| 5,616,078 A | 4/1997 | Oh et al. |
| 5,645,277 A | 7/1997 | Cheng |
| 5,796,354 A | 8/1998 | Cartabiano et al. |
| 5,982,355 A | 11/1999 | Jaeger et al. |
| D418,174 S | 12/1999 | Jankowski |
| D418,879 S | 1/2000 | Hornsby et al. |
| 6,173,203 B1 | 1/2001 | Barkley et al. |
| 6,192,253 B1 | 2/2001 | Charlier et al. |
| 6,430,110 B2 | 8/2002 | Baroche et al. |
| D472,972 S | 4/2003 | Anderson et al. |
| 6,544,124 B2 | 4/2003 | Ireland |
| 6,572,108 B1 | 6/2003 | Bristow |
| 6,590,835 B2 | 7/2003 | Farine et al. |
| 6,652,383 B1 | 11/2003 | Sonoda et al. |
| 6,970,157 B2 | 11/2005 | Siddeeq et al. |
| 7,004,469 B2 | 2/2006 | von Goeben et al. |
| 7,006,074 B2* | 2/2006 | Chesters ............... G06F 3/0312 345/156 |
| 7,106,197 B2 | 9/2006 | Gaiotto et al. |
| 7,331,793 B2 | 2/2008 | Hernandez et al. |
| 7,345,670 B2 | 3/2008 | Armstrong et al. |
| D586,823 S | 2/2009 | Anderson et al. |
| 7,627,139 B2* | 12/2009 | Marks ..................... A63F 13/00 382/103 |
| D616,417 S | 5/2010 | Liao et al. |
| 7,961,174 B1* | 6/2011 | Markovic ............... A63F 13/06 345/158 |
| 8,064,972 B2 | 11/2011 | McLoone |
| D656,996 S * | 4/2012 | Mikhailov ................. D21/333 |
| 8,188,842 B2 | 5/2012 | Otsuka et al. |
| 8,267,786 B2 | 9/2012 | Ikeda |
| 8,313,379 B2* | 11/2012 | Ikeda .................. A63F 13/213 463/38 |
| 8,439,753 B2 | 5/2013 | Wakitani |
| 8,795,078 B1* | 8/2014 | Musick, Jr. ........... G06F 3/0346 463/37 |
| 8,882,596 B2 | 11/2014 | Shimamura |
| 8,994,643 B2 | 3/2015 | Massie |
| D729,803 S | 5/2015 | Avery |
| 9,141,087 B2 | 9/2015 | Brown et al. |
| 9,386,662 B1 | 7/2016 | Hoddie |
| 9,421,472 B2 | 8/2016 | Buller |
| D772,986 S | 11/2016 | Chen et al. |
| D780,807 S | 3/2017 | Chen et al. |
| 9,678,566 B2 | 6/2017 | Webb et al. |
| D795,959 S | 8/2017 | Chen et al. |
| D800,841 S | 10/2017 | Chen |
| 9,804,693 B2 | 10/2017 | Long |
| D802,055 S | 11/2017 | Chen |
| 9,839,840 B2 | 12/2017 | Long et al. |
| 9,849,376 B2* | 12/2017 | Wilson .................. A63F 13/235 |
| D810,083 S * | 2/2018 | Kirkland ..................... D14/412 |
| 10,007,339 B2 | 6/2018 | Long |
| 2001/0015718 A1 | 8/2001 | Hinckley et al. |
| 2001/0045938 A1 | 11/2001 | Willner et al. |
| 2002/0072415 A1 | 6/2002 | Kikukawa et al. |
| 2002/0126092 A1* | 9/2002 | Tiphane .............. G06F 3/03543 345/163 |
| 2003/0100367 A1 | 5/2003 | Cooke et al. |
| 2004/0051694 A1* | 3/2004 | Backman ............... G06F 3/014 345/156 |
| 2004/0222963 A1* | 11/2004 | Guo ..................... G06F 3/0238 345/156 |
| 2004/0222970 A1 | 11/2004 | Martinez et al. |
| 2004/0224768 A1* | 11/2004 | Hussaini ............... A63F 13/24 463/37 |
| 2004/0263358 A1* | 12/2004 | Madsen ................. G06F 3/014 341/20 |
| 2005/0052291 A1* | 3/2005 | Backman ............. G06F 3/0237 341/22 |
| 2005/0248544 A1 | 11/2005 | Adam et al. |
| 2005/0255915 A1 | 11/2005 | Riggs et al. |
| 2006/0287089 A1 | 12/2006 | Addington et al. |
| 2007/0035518 A1* | 2/2007 | Francz ................... G08C 17/00 345/163 |
| 2007/0049374 A1* | 3/2007 | Ikeda .................... A63F 13/213 463/30 |
| 2007/0066394 A1 | 3/2007 | Ikeda et al. |
| 2007/0084293 A1 | 4/2007 | Kaiserman et al. |
| 2007/0268263 A1* | 11/2007 | Li .......................... G06F 3/0202 345/170 |
| 2007/0293318 A1 | 12/2007 | Tetterington et al. |
| 2008/0001787 A1* | 1/2008 | Smith ..................... H01H 13/83 341/23 |
| 2008/0261693 A1* | 10/2008 | Zalewski .............. A63F 13/424 463/31 |
| 2008/0261695 A1 | 10/2008 | Coe et al. |
| 2009/0005164 A1 | 1/2009 | Chang et al. |
| 2009/0143110 A1 | 6/2009 | Armstrong et al. |
| 2009/0149256 A1 | 6/2009 | Lui et al. |
| 2009/0290345 A1 | 11/2009 | Shaner et al. |
| 2009/0295721 A1 | 12/2009 | Yamamoto et al. |
| 2009/0298590 A1* | 12/2009 | Marks ..................... A63F 13/23 463/37 |
| 2010/0009760 A1 | 1/2010 | Shimamura et al. |
| 2010/0033427 A1* | 2/2010 | Marks ................... G06F 3/0346 345/156 |
| 2010/0053324 A1* | 3/2010 | Kim ....................... G06F 3/016 348/142 |
| 2010/0085321 A1 | 4/2010 | Pundsack et al. |
| 2010/0105475 A1* | 4/2010 | Mikhailov ............ G06F 3/0304 463/33 |
| 2010/0118195 A1 | 5/2010 | Eom et al. |
| 2010/0144436 A1* | 6/2010 | Marks ................... G06F 3/0383 463/36 |
| 2010/0177933 A1* | 7/2010 | Willmann ............. G06T 7/0012 382/107 |
| 2010/0184513 A1* | 7/2010 | Mukasa ................ A63F 13/211 463/37 |
| 2011/0205161 A1* | 8/2011 | Myers .................... G06F 3/0238 345/169 |
| 2011/0294579 A1 | 12/2011 | Marks et al. |
| 2012/0075173 A1* | 3/2012 | Ashbrook .............. G06F 3/014 345/156 |
| 2012/0088582 A1* | 4/2012 | Wu ..................... A63F 13/5255 463/37 |
| 2012/0202597 A1 | 8/2012 | Yee et al. |
| 2012/0261551 A1 | 10/2012 | Rogers et al. |
| 2012/0295707 A1* | 11/2012 | Nonaka .................. A63F 13/42 463/31 |
| 2013/0023341 A1* | 1/2013 | Yamanouchi ......... G06F 3/0346 463/31 |
| 2013/0162450 A1 | 6/2013 | Leong et al. |
| 2013/0265502 A1* | 10/2013 | Huebner ............... H04N 9/3173 348/789 |
| 2013/0324254 A1* | 12/2013 | Huang .................. A63F 13/218 463/37 |
| 2014/0015813 A1* | 1/2014 | Numaguchi ........... G06T 17/00 345/184 |
| 2014/0141891 A1 | 5/2014 | Georgy et al. |
| 2014/0203953 A1 | 7/2014 | Moser et al. |
| 2014/0228124 A1 | 8/2014 | Plagge et al. |
| 2014/0273546 A1 | 9/2014 | Harmon et al. |
| 2014/0361977 A1 | 12/2014 | Stafford |
| 2014/0362110 A1 | 12/2014 | Stafford |
| 2014/0364212 A1 | 12/2014 | Osman et al. |
| 2014/0378227 A1 | 12/2014 | Lee |
| 2015/0077398 A1 | 3/2015 | Yairi et al. |
| 2015/0094142 A1 | 4/2015 | Stafford |
| 2015/0155445 A1 | 6/2015 | Zhan |
| 2015/0234477 A1 | 8/2015 | Abovitz |
| 2015/0253574 A1 | 9/2015 | Thurber |
| 2015/0258431 A1* | 9/2015 | Stafford ............... A63F 13/5255 463/31 |
| 2015/0258432 A1 | 9/2015 | Stafford |
| 2015/0268920 A1 | 9/2015 | Schapiro |
| 2015/0370320 A1 | 12/2015 | Connor et al. |

(56) References Cited

U.S. PATENT DOCUMENTS

| | | | |
|---|---|---|---|
| 2016/0158625 A1* | 6/2016 | DeAngelis | A63B 71/0619 340/539.13 |
| 2016/0171771 A1* | 6/2016 | Pedrotti | G02B 27/017 345/633 |
| 2016/0225549 A1* | 8/2016 | Liu | G06F 3/0202 |
| 2016/0239109 A1* | 8/2016 | Xia | G06F 3/03541 |
| 2016/0351362 A1 | 12/2016 | Tsai | |
| 2016/0357249 A1 | 12/2016 | Webb et al. | |
| 2016/0357261 A1 | 12/2016 | Bristol | |
| 2016/0361637 A1 | 12/2016 | Higgins | |
| 2016/0361638 A1 | 12/2016 | Higgins | |
| 2016/0363996 A1* | 12/2016 | Higgins | A63F 13/216 |
| 2016/0364910 A1* | 12/2016 | Higgins | A63F 9/24 |
| 2017/0128828 A1 | 5/2017 | Long | |
| 2017/0136351 A1 | 5/2017 | Long | |
| 2017/0139481 A1 | 5/2017 | Long et al. | |
| 2017/0168303 A1 | 6/2017 | Petrov et al. | |
| 2017/0177102 A1 | 6/2017 | Long | |
| 2017/0189798 A1 | 7/2017 | Rogoza et al. | |
| 2017/0189799 A1 | 7/2017 | Anderson et al. | |
| 2017/0189802 A1 | 7/2017 | Rogoza et al. | |
| 2017/0192495 A1 | 7/2017 | Drinkwater et al. | |
| 2017/0192506 A1 | 7/2017 | Andersen et al. | |
| 2017/0235364 A1* | 8/2017 | Nakamura | G06F 3/016 345/156 |
| 2018/0047172 A1* | 2/2018 | Marks | G06F 3/016 |
| 2018/0061271 A1* | 3/2018 | Mohammed | G06F 3/017 |
| 2018/0067545 A1* | 3/2018 | Provancher | A63F 13/218 |

OTHER PUBLICATIONS

Canadian Examiner's Report in Patent Application No. 163,150, dated Apr. 8, 2016, 7 pages.
Canadian Examiner's Report in Patent Application No. 167,457, dated Apr. 8, 2016, 1 page.
Canadian Examiner's Report in Patent Application No. 167,458, dated Apr. 8, 2016, 1 page.
Canadian Examiner's Report in Patent Application No. 167,456, dated Apr. 8, 2016, 1 page.
First Examination Report in Indian Patent Application No. 278272, dated Mar. 18, 2016, 2 pages.
First Examination Report in Indian Patent Application No. 278275, dated Mar. 28, 2016, 2 pages.
First Examination Report in Indian Patent Application No. 278274, dated Mar. 14, 2016, 2 pages.
First Examination Report in Indian Patent Application No. 278273, dated Mar. 18, 2016, 2 pages.
Office Action in Korean Patent Application No. 30-2015-0063452, dated Aug. 9, 2016, 3 pages.
Office Action in Mexican Design Patent Application No. MX/f/2015/003769, dated Feb. 7, 2017, 4 pages.
Office Action in Brazil Design Patent Application No. 30-2015-005620-7, dated May 30, 2017,30 pages.
"STEM System" accessed and printed from URL <http://sixense.com/wireless>, 5 pages.
Tested, "Hands-On with Sixense Stem VR Motion-Tracking System" accessed and printedfrom URL <https://www.youtube.com/watch?v=C8z-On6FBTM>, 5 pages.
U.S. Appl. No. 15/177,121 by Anderson, B., et al., filed Jun. 2, 2016.
U.S. Appl. No. 29/579,091 by Chen, Y., et al., filed Sep. 27, 2016.
Notice of Allowance dated Jun. 29, 2016, U.S. Appl. No. 29/529,915 by Chen, Y., et al., filed Jun. 11, 2015.
Restriction Requirement dated Apr. 8, 2016, for U.S. Appl. No. 29/529,915 by Chen, Y., et al., filed Jun. 11, 2015.
Notice of Allowance dated Sep. 27, 2016, for U.S. Appl. No. 29/529,915 by Chen, Y., et al., filed Jun. 11, 2015.
Non-Final Office Action dated Mar. 30, 2017 for U.S. Appl. No. 14/939,470 by Long, C., et al., filed Nov. 12, 2015.
Non-Final Office Action dated Apr. 7, 2017 for U.S. Appl. No. 14/975,049 by Long, C., et al., filed Dec. 18, 2015.
Ex Parte Quayle Action mailed May 5, 2017 for U.S. Appl. No. 29/571,027 by Chen, Y., et al., filed Jul. 13, 2016.
Ex Parte Quayle Action mailed May 5, 2017 for U.S. Appl. No. 29/571,030 by Chen, Y., et al., filed Jul. 13, 2016.
Ex Parte Quayle Action mailed May 8, 2017 for U.S. Appl. No. 29/571,025 by Chen, Y., et al., filed Jul. 13, 2016.
Notice of Allowance dated Jun. 15, 2017 of U.S. Appl. No. 29/571,030 by Chen, Y., et al., filed Jul. 13, 2016.
Notice of Allowance dated Jun. 21, 2017 for U.S. Appl. No. 29/571,025 by Chen, Y., et al., filed Jul. 13, 2016.
Notice of Allowance dated Jun. 22, 2017 for U.S. Appl. No. 29/571,027 by Chen, Y., et al., filed Jul. 13, 2016.
Supplemental Notice of Allowability dated Jul. 10, 2017 of U.S. Appl. No. 29/571,030 by Chen, Y., at al., filed Jul. 13, 2016.
Supplemental Notice of Allowability dated Jul. 6, 2017 for U.S. Appl. No. 29/571,025 by Chen, Y., et al., filed Jul. 13, 2016.
Non-Final Office Action dated Jul. 17, 2017 for U.S. Appl. No. 14/939,431 by Long, C., et al., filed Nov. 12, 2015.
Final Office Action dated Aug. 18, 2017 for U.S. Appl. No. 14/939,470 by Long, C., et al., filed Nov. 12, 2015.
Non-Final Office Action dated Aug. 24, 2017 for U.S. Appl. No. 14/991,875 by Drinkwater, J., et al., filed Jan. 8, 2016.
Notice of Allowance dated Sep. 15, 2017 for U.S. Appl. No. 14/975,049 by Long, C. et al., filed Dec. 15, 2015.
U.S. Appl. No. 29/611,924 by Chen, Y., et al., filed Jul. 26, 2017.
Restriction Requirement dated Oct. 12, 2017 for U.S. Appl. No. 29/579,091 by Chen, Y., et al., filed Sep. 27, 2016.
Supplemental Notice of Allowability dated Sep. 29, 2017 for U.S. Appl. No. 29/571,027 by Chen, Y., et al., filed Jul. 13, 2016.
Non-Final Office Action dated Nov. 1, 2017 for U.S. Appl. No. 15/173,558 by Andersen, B., et al., filed Jun. 3, 2016.
Advisory Action dated Dec. 27, 2017 for U.S. Appl. No. 14/939,470 by Long, C., et al., filed Nov. 12, 2015.
Notice of Allowance dated Dec. 22, 2017 for U.S. Appl. No. 14/991,875 by Drinkwater, J., et al., filed Jan. 8, 2016.
Non-Final Office Action received for U.S. Appl. No. 14/934,073 dated Mar. 23, 2017, 22 pages.
Final Office Action received for U.S. Appl. No. 14/934,073 dated Nov. 2, 2017, 22 pages.
Notice of Allowance received for U.S. Appl. No. 14/934,073 dated Feb. 26, 2018, 29 pages.
U.S. Appl. No. 14/939,431 by Long, C., et al., filed Nov. 12, 2015.
U.S. Appl. No. 14/939,470 by Long, C., et al., filed Nov. 12, 2015.
U.S. Appl. No. 14/975,049 by Long, C., et al., filed Dec. 18, 2015.
U.S. Appl. No. 29/529,915 by Chen, Y., et al., filed Jun. 11, 2015.
U.S. Appl. No. 29/571,025 by Chen, Y., et al., filed Jul. 13, 2016.
U.S. Appl. No. 29/571,027 by Chen, Y., et al., filed Jul. 13, 2016.
U.S. Appl. No. 29/571,030 by Chen, Y., et al., filed Jul. 13, 2016.
U.S. Appl. No. 14/991,875 by Drinkwater, J., et al., filed Jan. 8, 2016.
U.S. Appl. No. 15/172,099 by Rogoza, B., et al., filed Jun. 2, 2016.
U.S. Appl. No. 15/173,474 by Rogoza, B., et al., filed Jun. 3, 2016.
U.S. Appl. No. 15/173,558 by Andersen, B., et al., filed Jun. 3, 2016.
Notice of Allowance dated Oct. 20, 2017 for U.S. Appl. No. 14/934,090 by Long, C., et al., filed Nov. 5, 2015.

* cited by examiner

CONTROLLERS WITH ASYMMETRIC TRACKING PATTERNS

This non-provisional patent application is a continuation that claims the benefit of U.S. patent application Ser. No. 14/934,073, filed 5 Nov. 2015, and titled "CONTROLLERS WITH ASYMMETRIC TRACKING PATTERNS," which is incorporated herein in its entirety by reference thereto.

TECHNICAL FIELD

This patent application is directed to handheld controllers and, more specifically, to hand held controllers for virtual reality systems.

BACKGROUND

In a virtual reality system, a user typically wears a head-mounted display that presents a selected virtual reality (VR) environment in front of the user's eyes. In some VR systems, a user can manipulate items in the virtual environment with handheld controllers. The controllers include tracking patterns comprised of a pattern of lights, for example. The system monitors the movement of the tracking patterns with a tracking camera and reproduces the user's hand movements in the virtual environment.

BRIEF DESCRIPTION OF THE DRAWINGS

Embodiments of the controllers with asymmetric tracking patterns introduced herein may be better understood by referring to the following Detailed Description in conjunction with the accompanying drawings, in which like reference numerals indicate identical or functionally similar elements.

Figure 1:
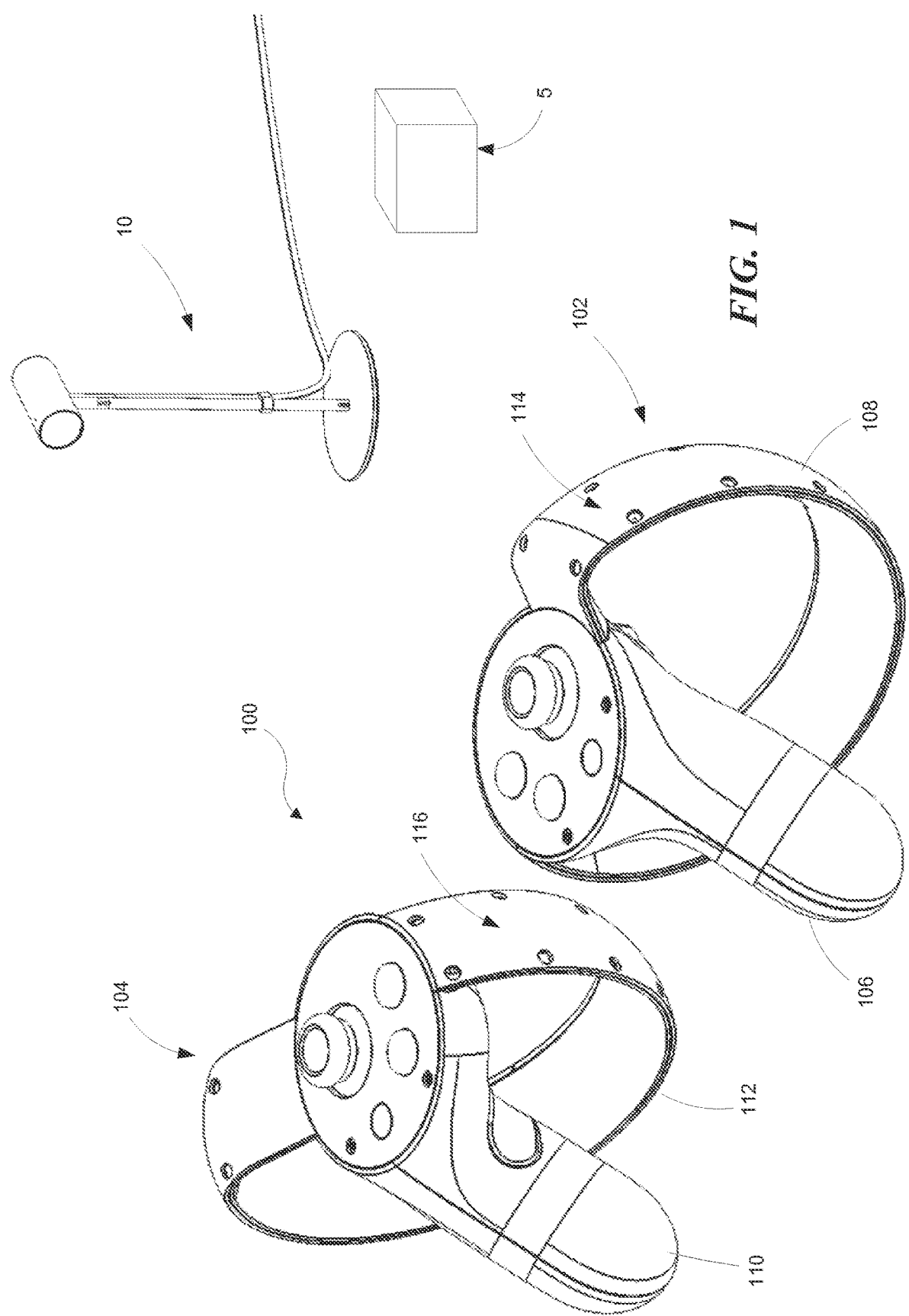
FIG. 1 is an isometric view of a pair of handheld controllers having asymmetric tracking patterns for use with a tracking camera according to a representative embodiment.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to limit the embodiments described. On the contrary, the embodiments are intended to cover all modifications, equivalents, and alternatives falling within the scope of the embodiments as defined by the appended claims.

DETAILED DESCRIPTION

Overview

A pair of handheld controllers with asymmetric tracking patterns for use with a tracking camera is disclosed. In some VR systems, a user can manipulate items in the virtual environment with a pair of handheld controllers. A tracking camera monitors the movement of a tracking pattern, comprised of a pattern of tracking features, such as lights or other markers, disposed on the controllers, so that the VR system can reproduce the users hand movements in the virtual environment. The pair of controllers includes a right-hand controller and a left-hand controller. In some embodiments, the right-hand and the left-hand controllers are substantially symmetric with respect to each other with the exception of their respective patterns of tracking features. A right-hand pattern of lights is disposed on the right-hand controller and a left-hand pattern of lights is disposed on the left-hand controller. The right-hand pattern of lights and the left-hand pattern of lights are asymmetric with respect to each other in order to facilitate distinguishing the left and right controllers from each other with the tracking camera.

In some embodiments, the right-hand controller includes a right-hand handle portion and a surrounding right-hand ring portion and the left-hand controller includes a left-hand handle portion and a surrounding left-hand ring portion. In some embodiments, the right-hand pattern of lights and the left-hand pattern of lights are disposed on the right-hand ring portion and the left-hand ring portion, respectively.

General Description

Various examples of the devices introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

FIG. 1 illustrates a pair of handheld controllers 100 according to a representative embodiment. The pair of handheld controllers 100 includes a right-hand controller 102 and a left-hand controller 104. Each controller 102 and 104 includes a ring portion and a handle portion. For example, the right-hand controller 102 includes a surrounding ring portion 108 and a handle portion 106. The left-hand controller 104 includes a surrounding ring portion 112 and a handle portion 110. The controllers 102/104 can be part of a VR system 5, such as the Rift™ available from Oculus™' Each of the controllers 102/104 includes a plurality of tracking features positioned in a corresponding tracking pattern. The tracking features in the tracking patterns are configured to be accurately tracked by a tracking camera 10 to determine the motion, orientation, and/or spatial position of the controller for reproduction in a virtual environment. The tracking features can include, for example, fiducial markers or light emitting diodes (LED). In the illustrated embodiment described herein the tracking features are LED lights, although other lights, reflectors, signal generators or other passive or active markers can be used in other embodiments. In at least one embodiment, the right-hand controller 102 includes a right-hand constellation or pattern of lights 114 disposed on the ring portion 108. Similarly, the left-hand controller 104 includes a left-hand pattern of lights 116 disposed on the ring portion 112.

Figure 2:
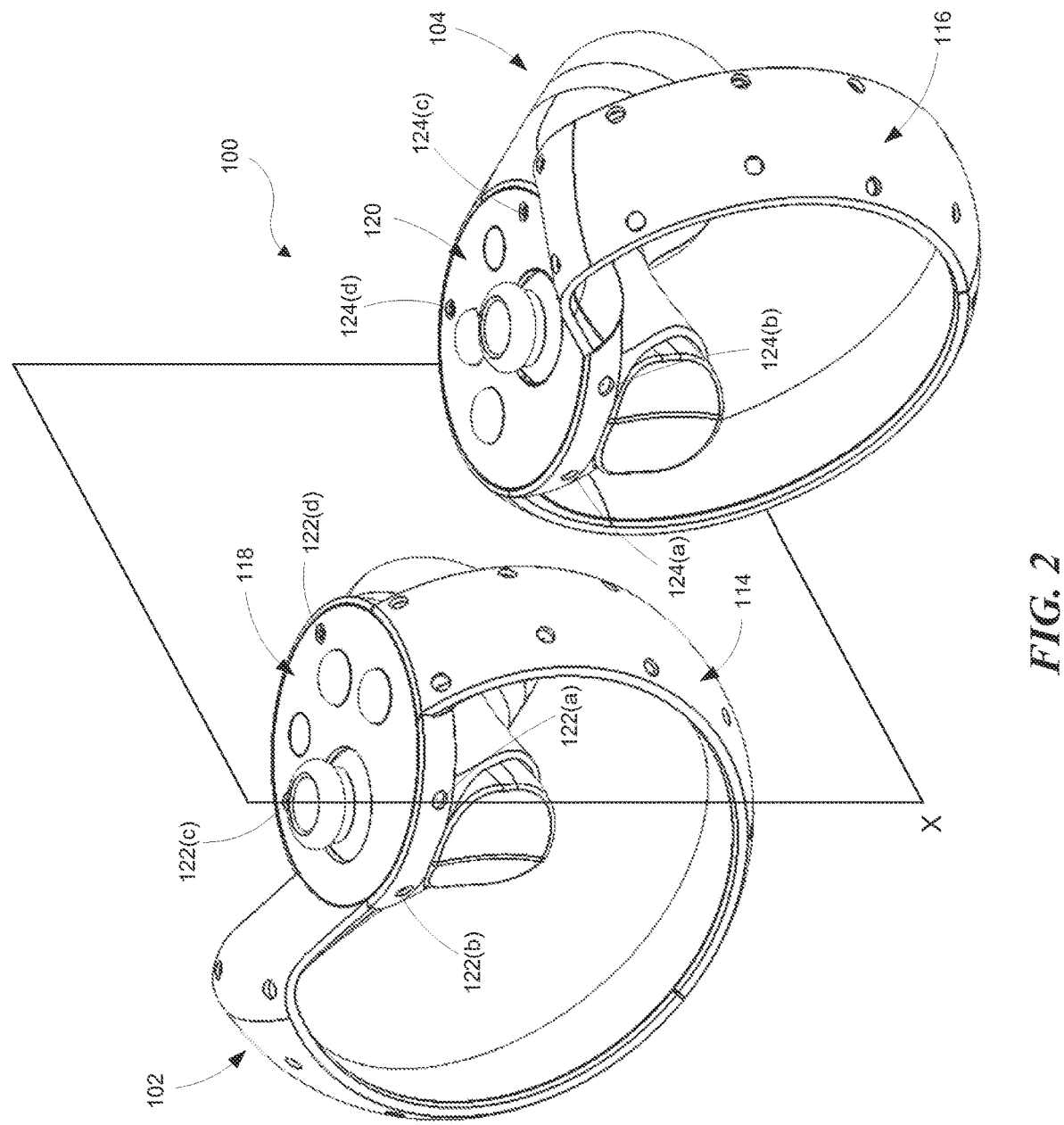
FIG. 2 is an isometric view of the handheld controllers shown in FIG. 1 as viewed from the front of the controllers.

With reference to FIG. 2, the primary structure of the right-hand controller 102 and the left-hand controller 104 when held adjacent to each other in a similar orientation as illustrated are substantially symmetric with respect to each other. In other words, the primary structures of controllers 102/104, such as the respective handle and ring portions, are substantially mirror images of each other with respect to plane X as illustrated. This property is sometime referred to as chirality. The right-hand controller 102 and the left-hand controller 104 are substantially symmetric with respect to each other with the exception of the right-hand pattern of lights 114 and the left-hand pattern of lights 116, which are asymmetric with respect to each other. In some embodiments, the controllers 102/104 also each include a plurality of handle-mounted tracking features arranged in a pattern that is symmetrical with respect to the pattern of handle-mounted tracking features of the opposite controller. For example, right-hand controller 102 includes a right-hand handle pattern 118 comprised of lights 122A-D. Similarly, the left-hand handle pattern 120 includes a plurality of lights 124A-D. Thus, the right-hand handle pattern 118 and the left-hand handle pattern 120 are substantially mirror images of each other with respect to plane X as illustrated.

Figure 3:
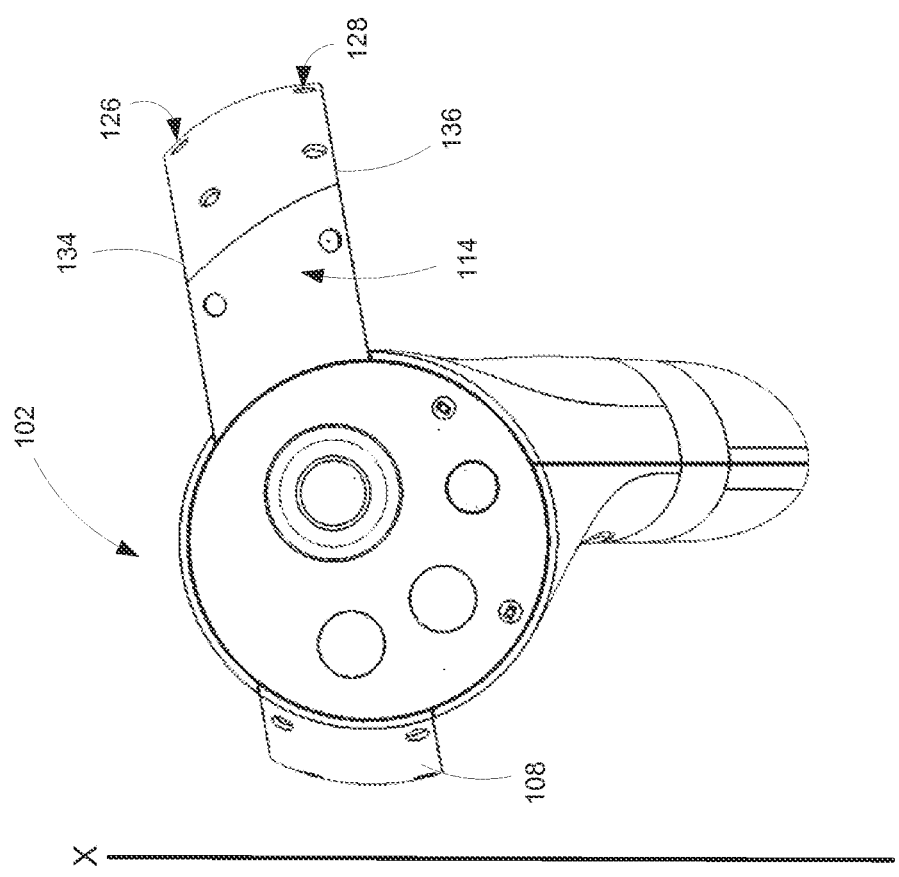
FIG. 3 is a top plan view of the handheld controllers shown in FIGS. 1 and 2.
Figure 3:
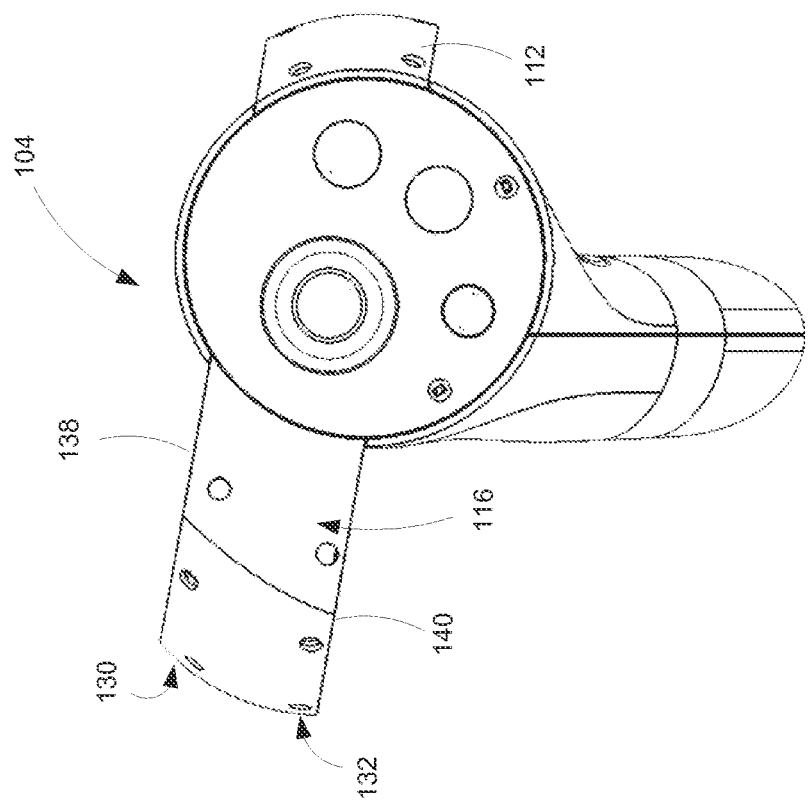

As shown in FIG. 3, the right-hand pattern of lights 114 on the right-hand controller 102 and the left-hand pattern of lights 116 on the left-hand controller 104 each comprises first and second rows of lights positioned around the outer circumference of their respective ring portions 108/112. For example, the right-hand pattern of lights 114 includes a first row 126 positioned adjacent a forward edge 134 of the ring portion 108 and a second row 128 positioned adjacent a rear edge 136 of the ring portion 108. Similarly, the left-hand pattern of lights 116 includes a first row 130 positioned adjacent a forward edge 138 of the surrounding ring portion 112 and a second row 132 positioned adjacent a rear edge 140 of the ring portion 112.

Figure 4:
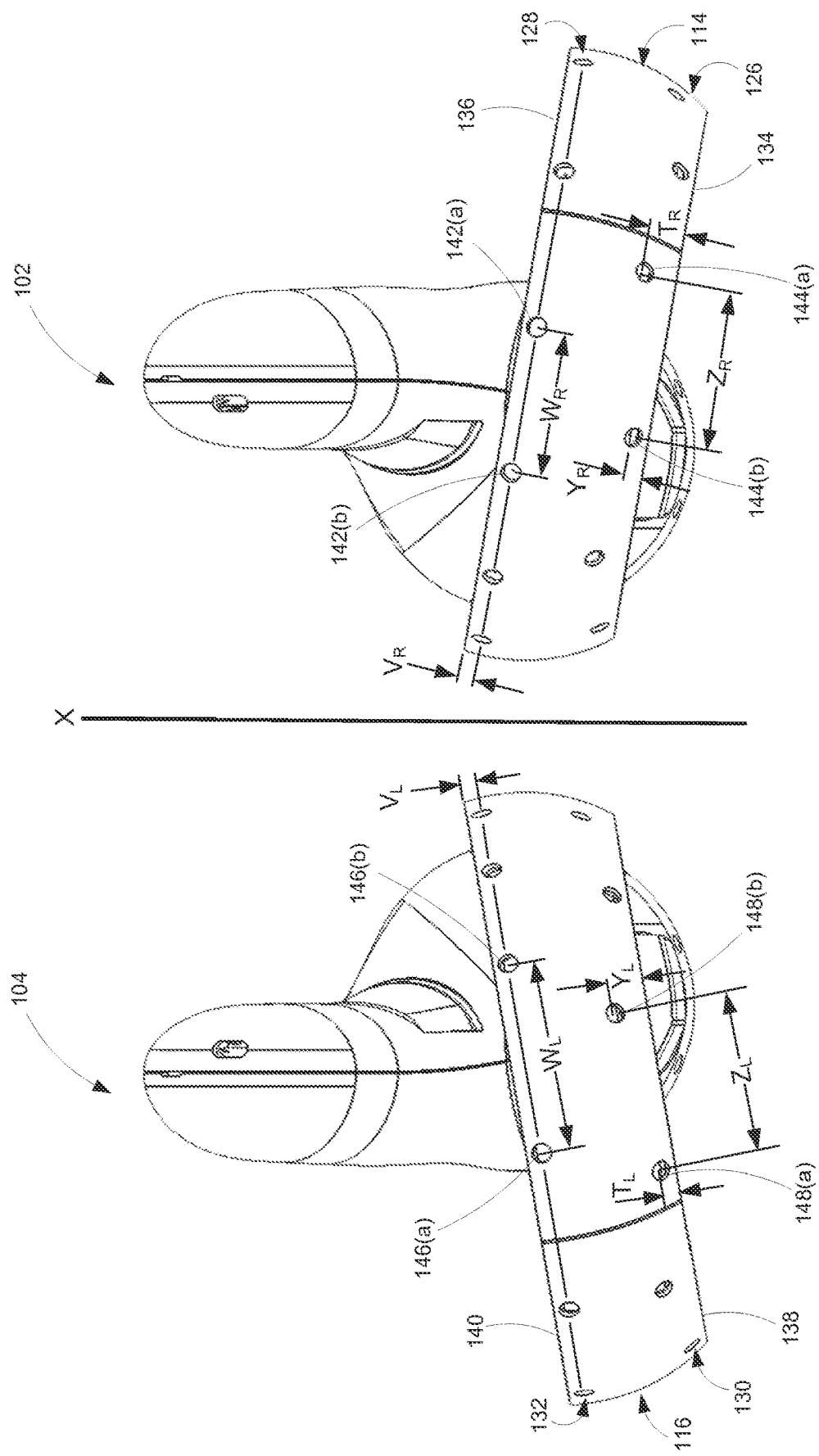
FIG. 4 is a bottom plan view of the handheld controllers shown in FIGS. 1-3.

With further reference to FIG. 4, it can be appreciated that each light of the first rows 126 and 130 are positioned at alternating first and second distances from the forward edge. For example, the first row of lights 126 on the right-hand controller 102 includes lights 144A and 144B. The light 144A is positioned a distance $T_R$ from the front edge 134 and the light 144B is positioned a distance $Y_R$ from the front edge 134. The corresponding lights of the left-hand controller 104 in row 130 are 148A and 148B. The light 148A is spaced a distance $T_L$ from the front edge 138 and the light 148B is spaced a distance $Y_L$ from the front edge 138. The right-hand light pattern 114 is asymmetrical with respect to the left-hand light pattern 116 with respect to plane X at least because corresponding lights 144B and 148B are positioned at different distances from their respective front edges 134 and 138. Specifically, light 144B is positioned a distance $Y_R$ which is less than the distance $Y_L$ corresponding to the distance that the light 148B is positioned from the front edge 138. Similarly, the light 144A and corresponding light 148A are spaced at different distances from their respective front edges 134 and 138. Specifically, the light 144A is positioned a distance $T_R$ from the front edge 134 which is greater than the distance $T_L$ at which the light 148A is positioned from the front edge 138. In some embodiments, the lights 144A and 144B are spaced apart a circumferential distance $Z_R$ which is the same as the circumferential distance $Z_L$ corresponding to the distance between the light 148A and the light 148B of the left-hand controller 104. Thus, the lights of the first rows 126 and 130 in the illustrated embodiment are positioned at alternating axial distances with respect to their front edges but with the same or similar circumferential distances with respect to each other.

Each light of the second rows 128 and 132 of the illustrated embodiment are positioned at approximately the same distance from their respective rear edges 136 and 140. For example, the second row of lights 128 on the right-hand controller 102 includes lights 142A and 142B positioned a distance $V_R$ from the rear edge 136. The left-hand controller 104 includes a second row of lights 132 positioned a distance $V_L$ from the rear edge 140. In the depicted embodiment, the distances $V_R$ and $V_L$ are substantially equal. However, the circumferential distance between corresponding lights of the right-hand controller 102 and the left-hand controller 104 varies, thereby, making the light pattern asymmetric. For example, the distance between the light 142A and the light 142B is $W_R$ which is less than the distance $W_L$ between the light 146A and 146B of the left-hand controller 104.

Also disclosed herein are methods of distinguishing between right- and left-hand handheld controllers with a tracking camera. In a representative embodiment, the method includes positioning a right-hand pattern of lights on the right-hand controller and positioning a left-hand pattern of lights on the left-hand controller wherein the left- and right-hand patterns of lights are asymmetric with respect to each other. In some embodiments, the method may also include illuminating the right-hand pattern of lights and the left-hand pattern of lights and capturing images of the right-hand pattern of lights and the left-hand pattern of lights with the tracking camera. The images of the right-hand pattern of lights and the left-hand pattern of lights are then compared to each other to distinguish between the right and left controllers. In some embodiments, the right-hand pattern of lights and the left-hand pattern of lights each comprise a plurality of infrared light emitting diodes generally arranged in a ring.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A handheld controller, comprising:
   a handle portion comprising a top end and a bottom end, the top end comprising opposing left-hand and right-hand sides; and
   a single ring portion connected to the handle portion, wherein:
   the ring portion extends in a left-hand direction from the left-hand side of the top end of the handle portion, the ring portion is connected to the left-hand side of the top end of the handle portion, and the ring portion curves in the left-hand direction away from the left-hand side of the top end of the handle portion;
   the ring portion also extends in a right-hand direction away from the right-hand side of the top end of the handle portion, the ring portion is connected to the right-hand side of the top end of the handle portion, and the ring portion curves away in the right-hand direction away from the right-hand side of the top end of the handle portion; and
   the ring portion comprises tracking features for tracking movement of the handheld controller.

2. The handheld controller of claim 1, wherein the tracking features comprise at least one of:
   fiducial markers;
   lights;
   reflectors; and
   signal generators.

3. The handheld controller of claim 2, wherein the tracking features comprise light emitting diodes.

4. The handheld controller of claim 3, wherein the light emitting diodes comprise infrared light emitting diodes.

5. The handheld controller of claim 1, wherein the ring portion forms an outer circumference.

6. The handheld controller of claim 5, wherein the tracking features are disposed on the outer circumference of the ring portion.

7. The handheld controller of claim 5, wherein a length of the handle portion from the top end to the bottom end is at a substantially 45 degree angle to a plane formed by the outer circumference.

8. The handheld controller of claim 1, wherein the ring portion connected to the handle portion forms a closed loop.

9. The handheld controller of claim 1, wherein the ring portion comprises a forward edge and a distinct rear edge.

10. The handheld controller of claim 9, wherein the tracking features comprise:
    a row of tracking features disposed adjacent the forward edge; and
    a row of tracking features disposed adjacent the distinct rear edge.

11. A handheld controller, comprising:
    a handle portion;
    a single ring portion comprising:
    an outer circumference;
    a forward edge;
    a distinct rear edge;
    a first row of tracking features that are positioned on the outer circumference adjacent the forward edge of the ring portion; and
    a second row of tracking features that are positioned on the outer circumference adjacent the distinct rear edge of the ring portion;
    wherein:
    the ring portion is connected to a left-hand side of a top end of the handle portion, and the ring portion curves away in a left-hand direction away from the left-hand side of the top end of the handle portion; and
    the ring portion is connected to a right-hand side of the top end of the handle portion, and the ring portion curves away in a right-hand direction away from the right-hand side of the top end of the handle portion.

12. The handheld controller of claim 11, wherein a distance of the first row of tracking features from the forward edge alternates repeatedly from a first distance to a second distance that is different than the first distance.

13. The handheld controller of claim 11, wherein the tracking features of the second row are positioned at approximately the same distance from the distinct rear edge.

14. The handheld controller of claim 11, wherein the tracking features of the first row are positioned at substantially the same circumferential distance with respect to each other.

15. A pair of handheld controllers, the pair of handheld controllers comprising:
    a right-hand controller with a tracking light pattern for tracking movement of the right-hand controller; and
    a left-hand controller with a tracking light pattern for tracking movement of the left-hand controller;
    wherein:
    the right-hand controller and the left-hand controller are substantially symmetric with respect to each other with an exception of their respective tracking light patterns;
    the right-hand tracking light pattern and the left-hand tracking light pattern are asymmetric with respect to each other despite the fact that the right-hand controller and the left-hand controller are substantially symmetric with respect to each other; and
    for each of the right-hand controller and the left-hand controller:
    a ring portion is connected to a left-hand side of a top end of a handle portion, and the ring portion curves away in a left-hand direction away from the left-hand side of the top end of the handle portion; and
    the ring portion is connected to a right-hand side of the top end of the handle portion, and the ring portion curves away in right-hand direction away from the right-hand side of the top end of the handle portion.

16. The pair of handheld controllers of claim 15, wherein the right-hand tracking light pattern includes a first row of tracking lights that is positioned adjacent a forward edge of a respective ring portion.

17. The pair of handheld controllers of claim 15, wherein the left-hand tracking light pattern includes a first row of tracking lights that is positioned adjacent a forward edge of a respective ring portion.

18. The pair of handheld controllers of claim 17, wherein, for the left-hand tracking light pattern, a second row of tracking lights is positioned adjacent a rear edge of the respective ring portion.

19. The pair of handheld controllers of claim 18, wherein tracking lights of the first row of the left-hand controller are disposed at a distance from the forward edge of the respective ring portion that alternates between a first distance and a second distance that is different than the first distance.

20. The pair of handheld controllers of claim 15, wherein both the right-hand tracking light pattern and the left-hand tracking light pattern comprise LED lights.

\* \* \* \* \*